United States Patent [19]

Searle et al.

[11] 3,977,131

[45] Aug. 31, 1976

[54] TIRE GRINDING MACHINES

[75] Inventors: Eric Henry Searle; Bernard Charles Allitt, both of Sutton Coldfield, England

[73] Assignee: Dunlop Limited, London, England

[22] Filed: Feb. 4, 1975

[21] Appl. No.: 547,039

[30] Foreign Application Priority Data

Feb. 9, 1974 United Kingdom.............. 06032/74

[52] U.S. Cl. ............................ 51/289 R; 51/106 R; 51/108 R; 51/237 T; 51/327
[51] Int. Cl.²....................... B24B 1/00; B24B 5/00
[58] Field of Search................ 51/33 W, 49, 51, 53, 51/99, 106 R, 108 R, 165.75, 165.76, 165.91, 216 ND, 237 T, 289 R, 327, DIG. 33; 157/13

[56] References Cited
UNITED STATES PATENTS

| 933,962 | 9/1909 | Dorsey | 51/53 |
|---|---|---|---|
| 1,415,842 | 5/1922 | Snyder | 51/108 R UX |
| 2,604,740 | 7/1952 | Perkins | 51/237 T |
| 2,610,446 | 9/1952 | Hawkinson | 51/51 |
| 2,985,231 | 5/1961 | Roesch | 51/106 R X |
| 3,177,773 | 4/1965 | Kehr | 51/53 X |
| 3,681,877 | 8/1972 | Shively | 51/106 R |
| 3,817,003 | 6/1974 | Monajjem | 51/281 R |
| 3,848,369 | 11/1974 | Monajjem | 51/106 R X |

*Primary Examiner*—James L. Jones, Jr.
*Attorney, Agent, or Firm*—Stevens, Davis, Miller & Mosher

[57] ABSTRACT

Method and apparatus for improving the uniformity of a tire and wheel assembly. The apparatus comrises a frame rotatable through four stations, and displaceable grinding and driving apparatus provided at two of the staions to drive the tire against a rotation grinding wheel, the direction of rotation of the tire and/or grinding wheel being reversed relative to the direction(s) at the previous station.

24 Claims, 6 Drawing Figures

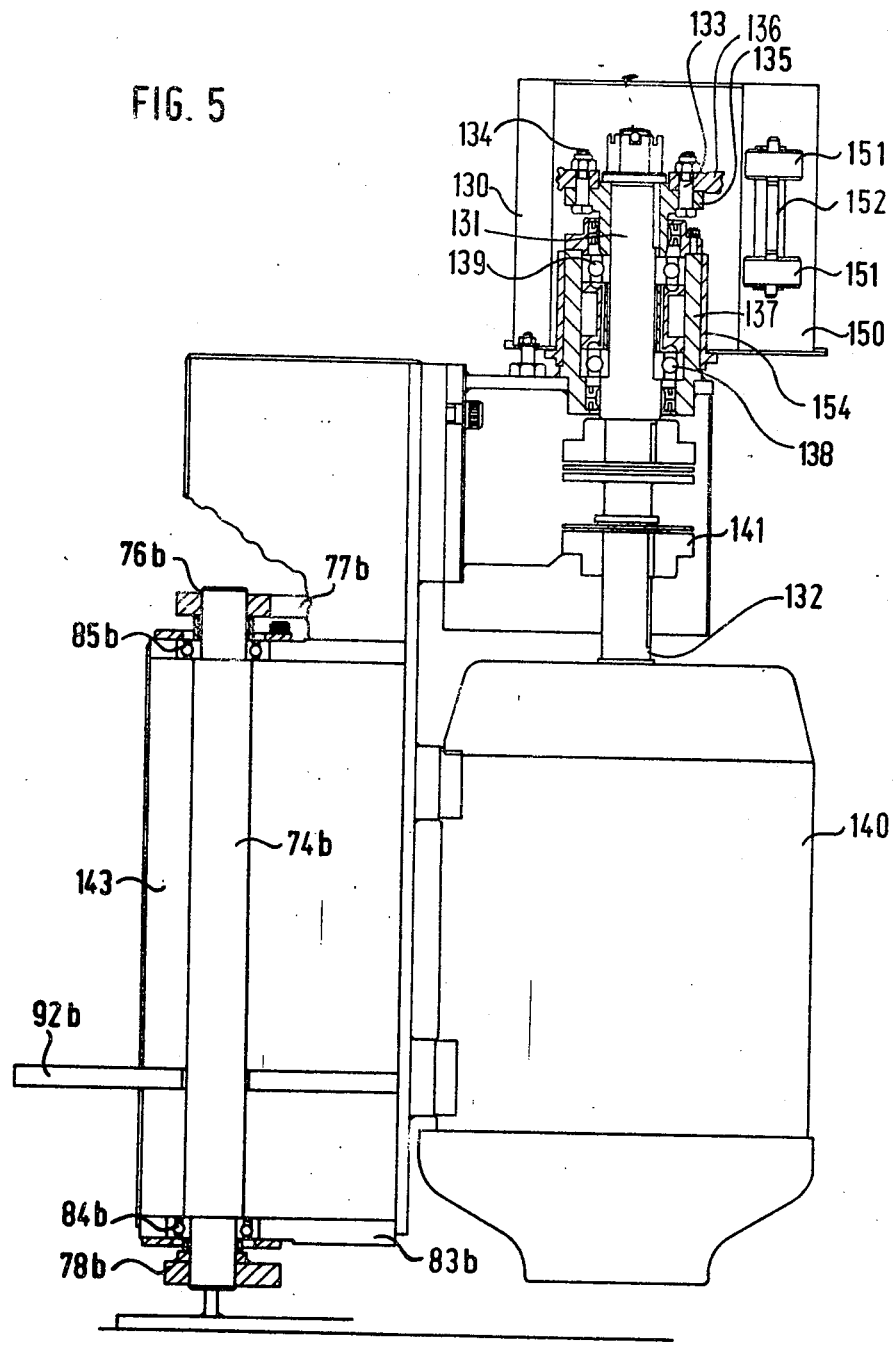

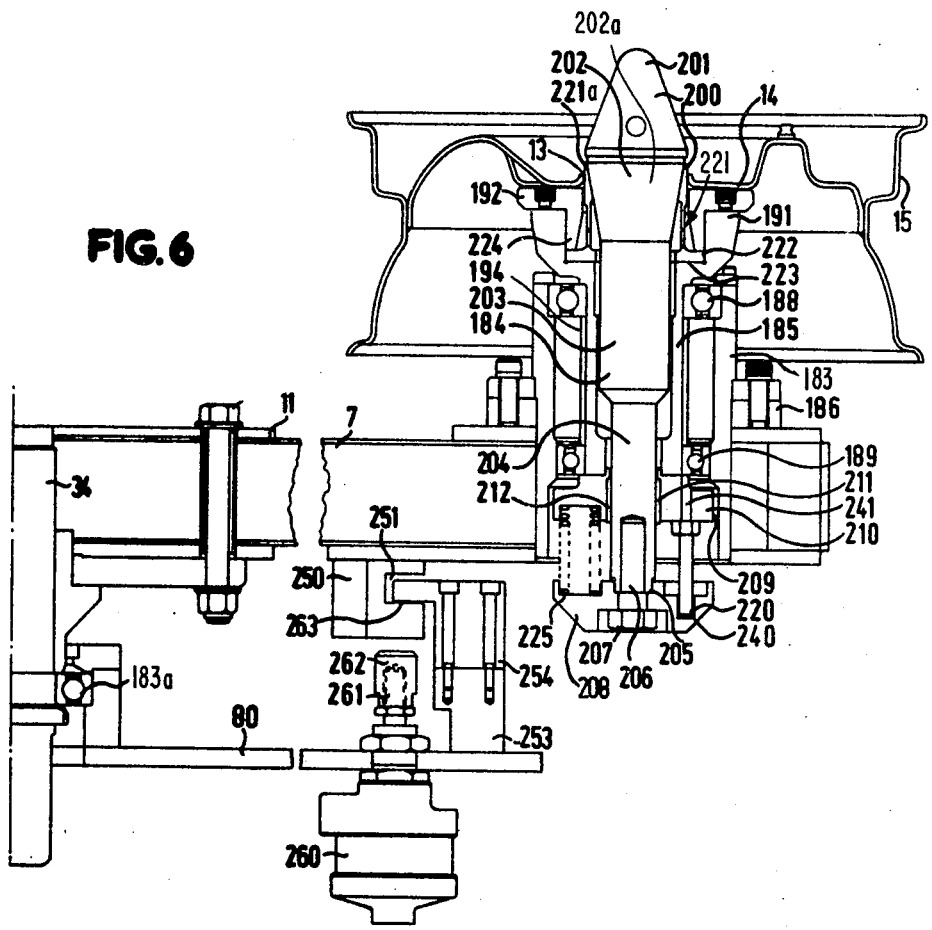

TIRE GRINDING MACHINES

This invention relates to a method and apparatus for improving the uniformity of pneumatic tires and of pneumatic tire and rim assemblies.

It is well known in the manufacture of pneumatic tires that is very difficult to produce a tire which is perfectly round and symmetrical. The nature of the manufacturing processes involved in the production of a tire can lead to faults in the concentricity and uniformity of the tire. When such tires are fitted to a wheel rim and the wheel and tire assembly used on a vehicle, radial force variations in the tire and rim assemblies can cause vibrations to be set up which may affect the steering and suspension of the vehicle, and in severe cases can lead to potentially dangerous situations.

To improve the concentricity and uniformity of a pneumatic tyre various machines exist which grind or cut the high spots off the tread surface of the tire. In the more sophisticated machines this operation is carried out by rotating the tire when mounted on a standard test wheel, measuring the force variation at the circumference and grinding the tire to reduce the force variation to a minimum. Unfortunately eccentricity and non-uniformity occur in the wheel rim as well as in the tire. Ideally the tire and rim should each be made to run true about their respective axes with any radial force variations reduced to a minimum, but in practice it is very difficult to produce true rims and tires individually, especially in the case of large high performance wheels and tires. By mating a tire to a particular wheel some of the non-uniformity problems can be arranged to balance each other out and it is possible by the use of selective grinding of the tire tread to produce a tire and wheel assembly which will run substantially true as a combination.

In a vehicle assembly plant, tire and wheel assemblies are required in large numbers and therefore it is essential that if a tire grinding operation is necessary, the operation must be carried out as quickly and efficiently as possible.

It is an object of the present invention to provide an improved method of improving the uniformity of a pneumatic tire or tire and rim assembly.

It is a further object of the present invention to provide an improved apparatus for improving the uniformity of a pneumatic tire or tire and rim assembly.

According to one aspect of the present invention a method for improving the uniformity of a pneumatic tire or tire and rim assembly comprises locating the tire or tire and rim assembly on rotatable mounting means, rotating the tire with the tread of the tire in engagement with a first rotating grinding wheel, moving the rotatable mounting means to bring the tread of said tire into engagement with a second rotating grinding wheel, and rotating the tire, the direction of rotation of the second grinding wheel or the direction of rotation of the tire when in contact therewith or both of said directions of rotation being reversed relative to the corresponding direction or directions of rotation when the tire is in contact with the first grinding wheel.

According to a further aspect of the present invention apparatus for improving the uniformity of a pneumatic tire or tire and rim assembly comprises means for mounting a tire or tire and rim assembly for free rotation about the axis of the tire, said means being locatable in a plurality of positions, means being provided to rotate the tire in one of said positions about its axis against a first grinding wheel engageable with the tread of the tire, and means being provided to rotate the tire in the other of said positions about its axis against a second grinding wheel engageable with the tread of the tire, the direction of rotation of the second grinding wheel or the direction of rotation of the tire when in contact therewith or both of said directions of rotation being reversed relative to the corresponding direction or directions of rotation when the tire is in contact with the first grinding wheel.

According to a still further aspect of the invention apparatus for improving the uniformity of a pneumatic tire or tire and rim assembly comprises at least one supporting arm arranged to carry a means for mounting a tire or tire and rim assembly for free rotation about the axis of the tire, the supporting arm being displaceably locatable in a plurality of positions, means being provided at two separate positions to engage the tire, a grinding wheel carried on a support member in each of said two separate positions, the grinding wheel support member being displaceable and an adjustable gauge means being provided to control the degree of engagement between the tread surface of the tire and the surface of the grinding wheel, the direction of rotation of the second grinding wheel or the direction of rotation of the tire when in contact therewith or both of said directions of rotation being reversed relative to the corresponding direction or directions of rotation when the tire is in contact with the first grinding wheel.

The tire may be mounted on a conventional wheel rim and inflated to the normal running pressure, the tire and wheel assembly being subsequently secured onto a chuck assembly for free rotation thereon about the axis of the tire. Alternatively the tire may be mounted on supporting means forming part of the apparatus and subsequently inflated to the normal running pressure, the supporting means acting as a wheel rim and forming part of the apparatus.

The tire or tire and rim assembly may be supported on a frame rotatable about a base structure. The frame may be displaceable to a number of positions, and stops are provided to ensure that the frame is indexed to predetermined positions.

Preferably four positions are provided, said positions defining a loading stage, a first grinding stage, a second grinding stage and an unloading stage.

A displaceable grinding assembly and a means to rotate the tire or tire and rim assembly may be provided at each grinding stage, each grinding assembly and rotating emans being secured to the base structure and provided with means to bring said assemblies into contact with the tread surface of the pneumatic tire.

One embodiment of the invention will now be described by way of example only with reference to the accompanying drawings in which:

FIG. 5 is a sectional view taken along the line E—E of FIG. 2, and

FIG. 6 is a sectional view taken along the line D—D of FIG. 2.

Figure 1:
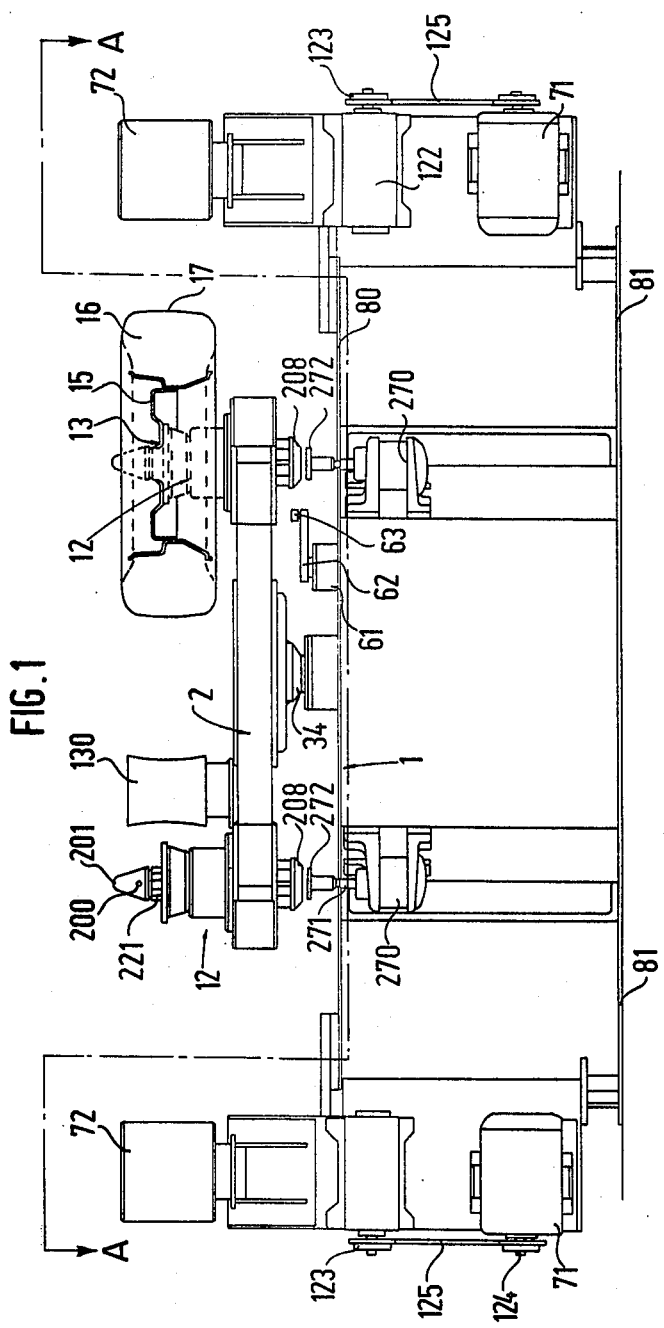
FIG. 1 is a side elevation of a tire grinding apparatus.
Figure 2:
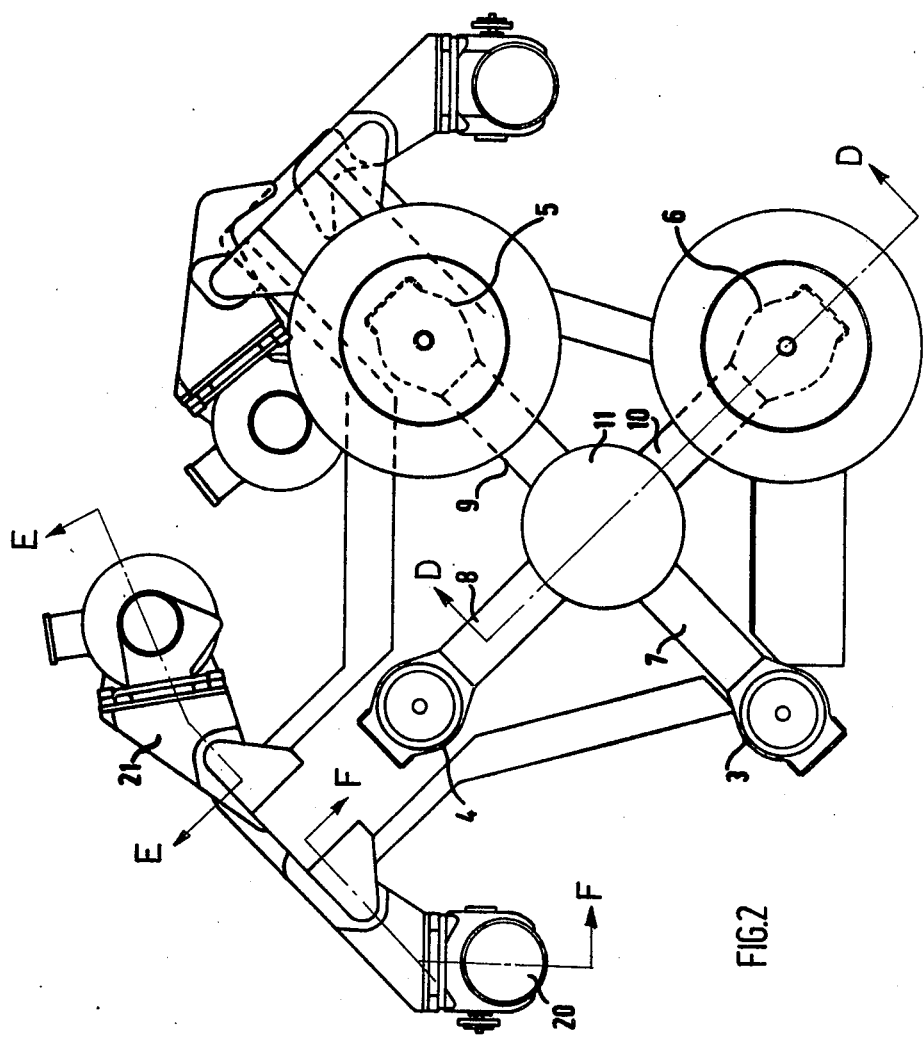
FIG. 2 is a plan view of the apparatus.

Apparatus for improving the uniformity of pneumatic tire and wheel assemblies (as shown in FIG. 1) comprises a base structure 1 which supports a four-armed rotatable frame 2 (see FIG. 2). The outer ends of the arms are associated, respectively, with four stages comprising a loading stage 3, a first grinding stage 4, a second grinding stage 5, and an unloading stage 6.

The four arms 7, 8, 9 and 10 are secured in an equally spaced configuration around a central turret 11, forming a right angled cross lying in a horizontal plane parallel and vertically above the base structure 1 as shown in FIG. 1. The outer ends of the arms 7, 8, 9 and 10 are each arranged to support a chuck 12, for each arm, the chucks 12 each being arranged to support a wheel and tire assembly 17 about a central spigot hole 13 formed in the center of the disc 14 of the wheel 15. In this manner each arm of the frame can support a tire and wheel assembly 17 with the axis of the wheel parallel to the vertical axis of the apparatus as shown in FIG. 1.

Figure 3:
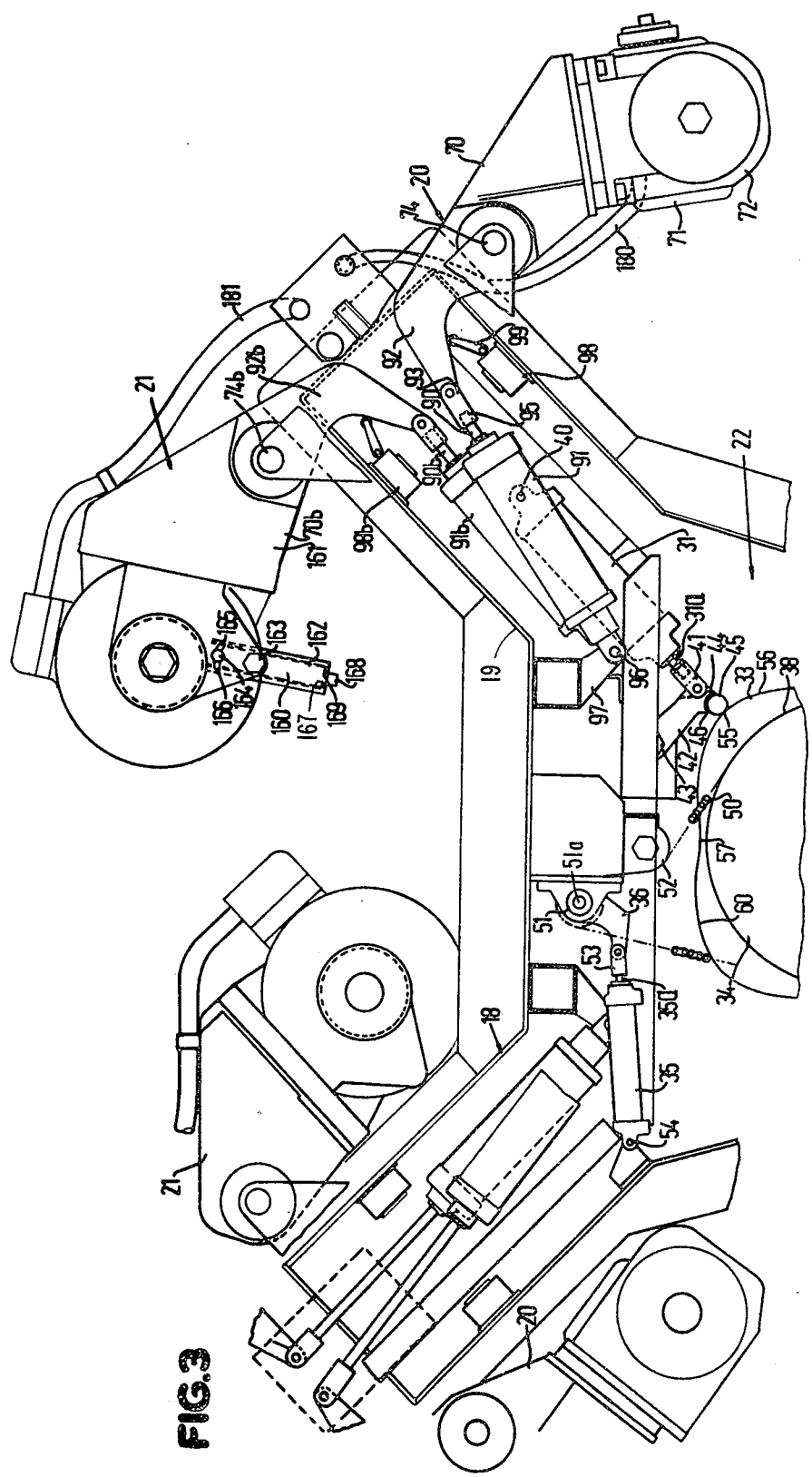
FIG. 3 is a sectional view taken along the line A—A of FIG. 1.

As shown in FIG. 3 the base structure 1 is provided with two outwardly extending support platforms 18 and 19 which are positioned vertically underneath the arms at the first and second grinding stages 4 and 5, each platform 18 or 19 being arranged to support a driving mechanism 20 which is engageable with the tread of the tire, to rotate the tire and wheel assembly about the wheel axis. Each support platform 18 and 19 also supports a grinding apparatus 21 for grinding the tread of the pneumatic tire 16 of the tire and wheel assembly 17.

The frame 2 is rotated through each of the stages 3, 4, 5 and 6 by an indexing mechanism 22 (shown in FIG. 3 but not shown on FIGS. 1 and 2) which ensures that the frame is indexed by 90° at each movement. The driving mechanism 20 and grinding apparatus 21 at each grinding stage are arranged to be pivotably mounted on the base structure 1 so that they can be displaced away from the tire and wheel assembly to allow rotation of frame 2. The driving mechanism and grinding apparatus are arranged to engage the tire on approximately diametrically opposite sides of the tire, to ensure that the moments about the frame axis set up on the tire and wheel assembly by the driving mechanism and grinding apparatus are substantially balanced, thereby preventing an unnecessary torque being applied to the frame.

Various components of the apparatus will now be described in greater detail with reference to FIGS. 3 to 5 of the accompanying drawings.

FIG. 3 shows details of the actuating means for the indexing mechanism 22 to rotate the frame 2 about the base structure 1, and also shows the actuating means for displacing the driving mechanism 20 and grinding apparatus 21 at each of the two grinding stages 4 and 5.

The indexing mechanism 22 is located within the base structure 1 and drives the frame 2 via a centrally positioned vertically extending shaft 34. The upper end of the shaft 34 is rigidly secured to the central turret 11 (shown in FIG. 2) of the frame 2, and the lower end of the shaft 34 is arranged to extend into the base structure and coaxially support a toothed chain wheel 38 and a four-lobed cam 33. The cam 33 and chain wheel 38 are respectively keyed to the shaft 34 in axially spaced positions. The cam 33 is arranged to engage a roller 45 which is connected via a heel member 42 and clevis 41 to the piston rod 31a of a pneumatically actuated 3 inch diameter piston and cylinder assembly 31. The closed end 40 of the cylinder assembly 31 is pivotally secured to the base structure 1 and the piston rod 31a is threaded into the clevis 41 which in turn is pivotally secured to the heel member 42. The heel member 42 has one end 43 pivotally secured to the base member 1 and supports at the opposite end 44 the roller 45 which is mounted with freedom to rotate in a cut-out 46 provided on one face of the heel member 42. The cam 33 is profiled so that the four lobes are identical and are equispaced around the cam periphery.

The chain wheel 38 is driven through a chain 50 by a sprocket 51, which is arranged about a shaft 51a, the shaft also being arranged to coaxially support an elbow-shaped lever 36 which includes a ratchet mechanism (not shown). The sprocket 51 and lever 36 are coaxially mounted on the base structure 1 to allow a certain degree of rotation of both the member 36 and the sprocket 51. The free wheel mechanism of the ratchet is arranged so that the lever 36 can only urge the sprocket 51 in one direction, clockwise as shown in FIG. 3. An adjustable tensioning means 52 is secured to the base support structure 1 and is arranged to engage the chain 50. The elbow-shaped lever 36 is pivotally secured at the end remote from the sprocket 51 to a clevis 53, the clevis 53 being threaded onto a piston rod 35a of a 1½ inch diameter piston and cylinder assembly 35 which is pivotally secured at one end 54 to the support structure 1.

In operation the indexing mechanism 22 operates as follows:

The piston and cylinder assembly 35, is pneumatically actuated to urge the elbow-shaped member 36 to rotate the sprocket 51 and thereby rotate the large chain wheel 38 via the chain 50. The stroke of the piston rod 35a is restricted so that the resultant displacement of the large chain wheel 38 is in the order of 15° and is sufficient to displace the apex 55 of the lobe 56, away from the roller 45 furnished on the heel member 42. The 3 inch diameter piston and cylinder assembly 31 is arranged to be in the actuated condition so that the roller 45 is in engagement with the inclined side of the lobe 56 of the cam 33. On rotation of the cam 33 a component of the force exerted by the piston rod 31a forces the roller down the inclined side of the lobe 56 and thereby forces the cam 33 and shaft 34 to rotate. The roller 45 continues to push the cam and shaft 34 round until the roller reaches the point 57 of zero gradient between the lobe 56 and the adjacent lobe 60. With the roller 45 in this position the shaft 34 and cam 33 have been rotated through 45°. The momentum inherent in the shaft 34 and frame 2 continues to rotate the shaft forcing the roller to climb up the inclined slope of the adjacent lobe 60 thereby forcing the piston rod 31a via the heel member 42 and link 41 back into the cylinder 31.

During the rotation of the large chain wheel 38 the chain 50 drives the sprocket 51, the ratchet mechanism allowing the sprocket 51 to free-wheel about its mounting point thereby not affecting the elbow-shaped lever 36, the cylinder 35 being returned to its starting position as soon as it has reached the end of its stroke. Ideally, the thrust exerted by the two piston and cylinder assemblies 35 and 31 on the chain wheel 38 and cam 33 respectively should be sufficient to enable the cam 33 and shaft 34 to complete 90° of rotation, but due to the various frictional forces generated within the mechanical components, 100% efficiency is not possible and therefore the roller 45 eventually comes to rest some way up the inclined face of the lobe 60, the shaft having been indexed through an angle of approximately 75°. To complete the 90° index the smaller piston and cylinder assembly 35 is again actuated thereby forcing the elbow-shaped member 36 to rotate the sprocket 51 and thereby the larger chain wheel 38, to enable the roller 45 to complete its travel up the inclined face of the lobe 60. When the shaft has completed about 88° of rotation a limit switch is actuated which exhausts the piston and cylinder assembly 35 and allows the cam 33 and shaft 34 slowly to come to rest within 2° or 3° above or below the required 90° index.

To finally position the frame and ensure that the shaft and frame has been indexed to exactly 90°, a 3 inch diameter piston and cylinder assembly is operatively connected to an arm 62 (FIG. 1) which is arranged to extend through the support structure 1. The arm is connected to a roller 63 which is arranged to locate in a V-shaped block (not shown) which is secured to the underside of one of the arms of the frame. Actuation of the piston and cylinder assembly forces the roller into the V of the block until the roller abuts the apex of the V thereby ensuring that the frame 2 is finally located in the required position.

The actuating means for the driving mechanism 20 and grinding apparatus 21 is similar in both grinding stations and therefore the construction of one such station only will be described with reference to FIGS. 3, 4 and 5. The driving mechanism 20 comprises a support member 70 which houses an electric motor 71 which drives a steel drum 72. Details of the drum and driving mechanism are described later in the specification.

As shown in FIG. 1 the base structure 1 comprises a closed steel box, the top and bottom of which form an upper horizontally extending mounting plate 80 and a base plate 81. The driving mechanism support frame 70 is secured to the base structure 1 by means of a vertically extending shaft 74 (see FIG. 4) which is arranged to locate within apertures 75 and 76 formed in two attachment flanges 77 and 78, the attachment flanges being bolted respectively to the upper mounting plate 80 and base plate 81 of the structure 1. The support frame 70 is provided with top and bottom flanges 82 and 83 through which the shaft 74 extends, the shaft being supported therein by means of ball bearings 84 and 85 which are held in position by means of end plates 86 and 87, the end plates 86 and 87 being bolted to the respective flanges 82 and 83 of the support frame. Spacing members 88 and 88a are provided at the ends of the support frame 70 to ensure that the support frame 70 does not foul the attachment flanges 77 and 78. The support frame 70 when supported in the above manner, is free to pivot about the shaft 74 and is displaceable so that the driving mechanism can engage the tread of the tire and wheel assembly.

Figure 4:
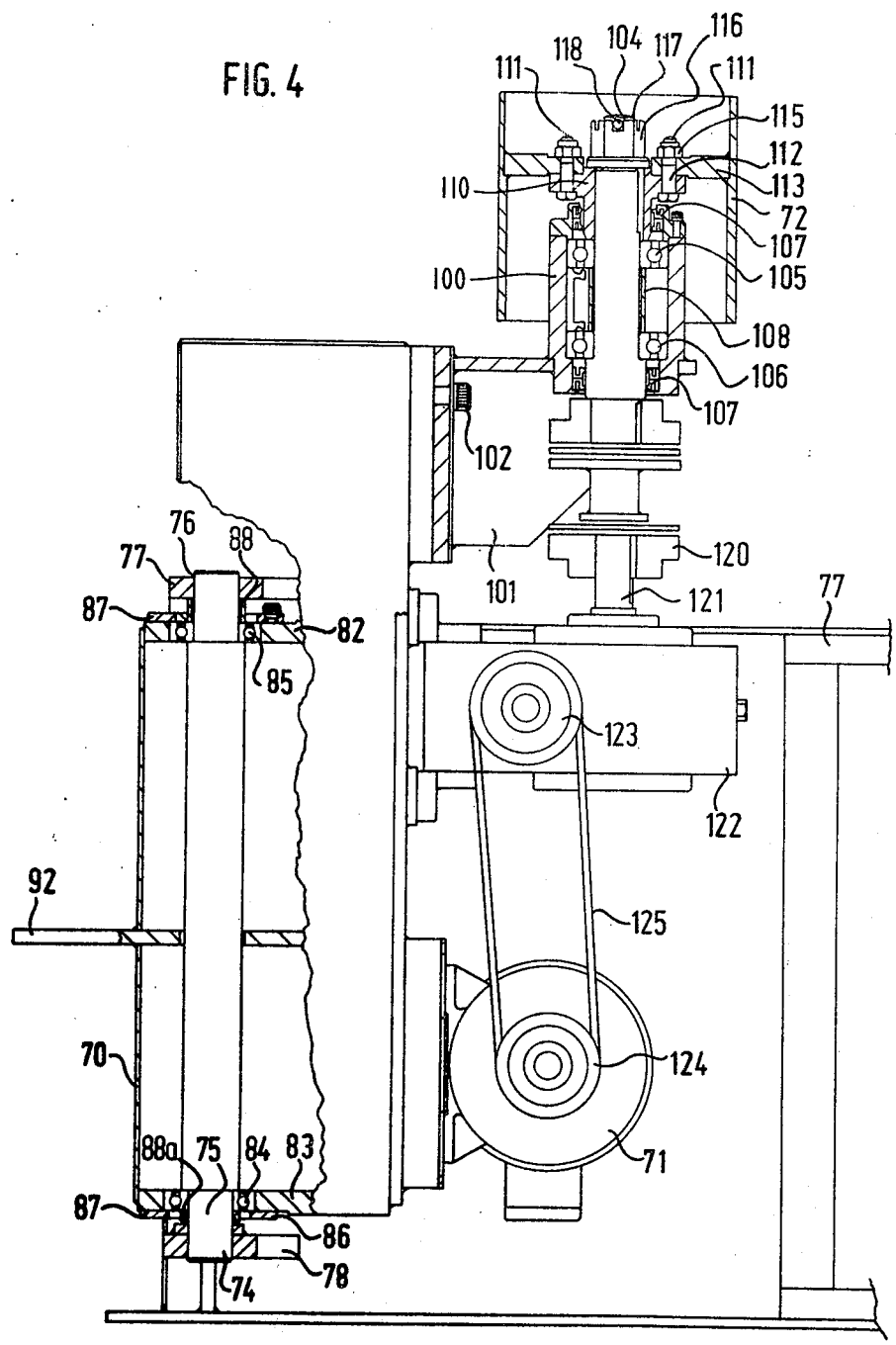
FIG. 4 is a sectional view taken along the line F—F of FIG. 2.

As shown in FIG. 3, the support frame 70 is displaceable by means of a pneumatic piston 90 and cylinder 91 assembly via an elbow-shaped arm 92, the arm 92 being welded to the support frame 70 at a position approximately between the base and top of the frame 70 (FIG. 4). The arm 92 is connected to the piston rod associated with the piston 90 via a clevis 93 which is pinned to the arm 92 at one end and screws onto an externally threaded portion 95 of the piston rod at the other end. The closed end 96 of the cylinder 91 is pivotally secured to a mounting flange 97 which is welded to the base structure 1.

The pivoting mechanism of the support member 70 and the pneumatic piston and cylinder actuation means described above for the driving mechanism at one grinding stage is substantially the same as the support and actuation mechanism for the grinding wheel at the same stage. Furthermore both the driving mechanism and grinding apparatus at the second stage (shown on the left-hand side of FIG. 3) are supported by assemblies substantially similar to the assembly described above. Components of the pivoting mechanism of the support member and the pneumatic piston and cylinder actuation means for the grinding apparatus will be designated by the same reference numerals as the same components in driving mechanism except the suffix b will be used for the components of the grinding apparatus.

At the stage shown on the right-hand side of FIG. 3, the grinding apparatus 21 and driving mechanism 20 are shown with the piston and cylinder assemblies 91 and 91b in the fully retracted state, the grinding wheel and driving mechanism being in the non-operative position i.e. clear of the tire and wheel assembly (not shown). On the left-hand side of the drawing the piston and cylinder assemblies are shown in their fully extended state, and the driving mechanism and grinding apparatus are shown in position to engage the tread of the tire and wheel assembly (not shown).

A limit switch 98 is arranged to engage each arm 92 via a pivoting member 99, and is arranged to act as an interlock to prevent rotation of the frame (not shown) before the support member 70 has been displaced away from the tire and wheel assembly.

As shown in FIG. 4, the head of the driving mechanism 20 is supported by a cylindrical casing 100 which is welded to a support flange 101 which in turn is secured to the driving mechanism support frame 70 by means of four bolts 102. The head of the driving mechanism comprises a steel drum 72 which is coaxially mounted about a shaft 104, the shaft being arranged to extend coaxially through the casing 100 and being supported by coaxially spaced ball bearings 105, 106. Two annular oil seals 107 are positioned one at each end of the casing 100, and the ball bearings 105, 106 are axially spaced by means of a cylindrical spacing member 108. The steel drum 72, is mounted onto a driving flange 110 which is keyed onto the shaft 104 and is provided with six studs 111 equally spaced around a common pitch circle, the studs being arranged to engage within six corresponding apertures 112 provided in a mounting flange 113 of the steel drum 72. The steel drum is secured to the driving flange 110 by means of six nuts 115, which engage the studs 111. Axial displacement of the driving flange 110 is prevented by a castellated nut 116 which is screwed onto a threaded end portion 117 of the shaft 104 and is locked thereon by a split-pin 118.

The drive shaft 104 is connected via a coupling 120 to an outut shaft 121 of a 60:1 worm and wheel reduction gearbox 122. The gearbox 122 is secured to the driving mechanism support frame 70 and is driven by a pulley 123 which in turn is driven by a pulley 124 of the electric motor 71 via a belt drive 125.

FIG. 5 is a view similar to FIG. 4 but illustrates the grinding support mechanism and apparatus instead of the driving mechanism as previously described. The support mechanism for the grinding head is substantially similar to the support mechanism for the driving means and therefore will not be described again.

A tungsten carbide chipped grinding wheel 130 having a slightly concave grinding face as presented to the tread of a tire, the concavity of the grinding face corresponding to the profile of the tread, is mounted on a drive shaft 131 by means of six locating bolts and nuts 133 and 134, the studs being arranged to extend through a driving flange 135 which is keyed onto the shaft 131 and secured thereon by a castellated nut and a mounting flange 136 which is integral with the grinding wheel 130. The shaft 131 is coaxially supported within a casing 137 by axially spaced ball bearings 138 and 139. The construction of the casing and the details of the driving head are substantially the same as the driving head for the steel driving drum previously described.

The drive shaft 131 is connected to the output shaft 132 of an electric motor 140 via a coupling 141, the electric motor 140 being secured to the support frame 143 of the grinding apparatus. The electric motor has a power rating of 25 horse power and a speed of 3,000 revolutions per minute.

The grinding wheel is enclosed by a cowling 150 which is bolted to a cylindrical bush 154 which is mounted coaxially about the casing 137 to be rotatable about the casing. Two rollers 151 which are supported about a spindle 152 are positioned at each side of the cowling 150 and are arranged to abut the tread of the tire, such that when tire and wheel assemblies of differing diameters are positioned on the machine, the rollers on one side of the cowling will contact the tread of the tire and force the cowling 150 to pivot about the bush 154, thereby ensuring that the cowling does not foul the tire. The cowling 150 is coupled to an extraction fan (not shown) which removes the particles of rubber which are ground off the tire.

As previously described the grinding apparatus is arranged to pivot about a shaft 74b from a position of non-engagement with the tire and wheel assembly to a position where the surface of the grinding wheel engages the tread portion of the tire and wheel assembly. As shown in FIG. 3 the grinding apparatus is actuated by a piston and cylinder assembly via an arm 92b. In order to precisely determine the relationship between the grinding wheel and the tread surface of the tire, especially the diameter to which the tire is to be ground, a stop 160 is provided which is mounted on the support flange 161 of the grinding head, and is arranged to engage a further stop provided on the respective arm of the frame member 2.

As shown in FIG. 3 the stop 160 comprises a hollow cylindrical shaft 162 which is secured to the support flange 161 of the grinding head by a bolt 163. The shaft 162 is arranged to be pivotable about the axis of the bolt 163 and is provided with a locking mechanism which comprises a bolt 164 which locates within an arcuate slot 164 provided in one end 166 of the shaft 162 and screws into the support flange 161 such that the shaft 162 is displaceable about the bolt 164 along the slot 165. The other end 167 of the shaft 162 is arranged to support a small shock absorber 168, the piston of the said shock absorber 168 being arranged to act as the initial abutment member 169 of the stop 160. In operation, when the grinding wheel is brought into contact with the tire the abutment 169 of the stop 160 engages the corresponding adjustable shoulder provide on the respective arm of the frame 2, and the abutment 169 is depressed into the end 167 of the shaft until the damper is fully compressed. The damper is provided to ensure that there is no shock damage caused when the limiting stops abut each other. With the assembly as shown in FIG. 3, adjustment of the stops is carried out on the stop (not shown) which is supported on the respective arm of the frame. This assembly has the disadvantage that the stop on each of the four arms has to be adjusted to ensure that the grinding wheel assumes the same position for each arm of the frame. Furthermore, every time that the relative position of the grinding wheel and tire requires varying, an adjustment has to be carried out on the stops provided on each of the four arms. Therefore, an improved adjustable stop may be provided which is not shown on the drawings but comprises a frusto-conical outer member which is arranged to screw onto an externally threaded spigot, the spigot being rigidly secured to the support flange of the grinding head. A calibration device is mounted on the frusto-conical member and the stop is adjustable by screwing the frusto-conical member onto the spigot; a locking means being provided to lock the assembly when the required adjustments have been made. A small shock absorber is also located within the frusto-conical outer member for the purpose previously described.

As shown in FIG. 3 flexible conduits 180 and 181 are provided to supply the electrical power to the respective electric motors of the driving mechanism and grinding apparatus.

FIG. 6 shows one arm of the four-armed frame 2 and provides a detailed view of the chuck 12, illustrating the location of a wheel on the chuck. The arm 7 is secured to the central turret 11 by four nut and bolt assemblies 182. The turret 11 is keyed onto the vertically extending central shaft 34 which is supported by two axially spaced ball bearings 183a.

The arm 7 extends from the turret 11 to support the chuck 12 which in turn supports the wheel 15. The chuck 12 comprises an outer housing 183 which coaxially supports a rotatable chuck body 185, the chuck body 185 being arranged to support a vertically extending centering shaft 184. The outer housing 183 is provided with a mounting flange 186 which is bolted to the arm 7. The rotatable chuck body 185 is supported in a rotatable fashion within the outer housing 183 by two axially spaced ball bearings 188 and 189. One end of the chuck body 185 is arranged to provide an annular mounting flange 191 onto which is bolted a steel ring 192 which is arranged to support the disc 14 of the associated wheel 15.

The chuck body 185 is provided with an axially extending stepped throughway 194, the throughway being arranged to locate the centering shaft 184 in such a manner that the centering shaft is axially displaceable relative to the chuck body 185 but is located against displacement in the radial sense i.e. the centering shaft is located against horizontal displacement but is displaceable vertically as shown in FIG. 6. The centering shaft 184 is arranged to be of circular cross-section and is of varying cross-section along its length as follows:

The centering shaft 184 comprises a frusto-conical end portion 200 having a rounded tip 201, the maximum diameter of the frusto-conical end portion 200 being arranged to be slightly less than the diameter of the spigot locating hole 13 provided in the center of the wheel disc 14 so that the end portion 200 can be inserted through the wheel disc 14. The end portion 200 merges into a frusto-conical location portion 202, the inclined outer face 202A of which is inclined inwardly towards the base of the machine. The location portion 202 merges into a cylindrical portion 203 which in turn merges into a portion of reduced cross-section 204.

The end 205 of the reduced cross-sectional portion 204 is provided with a threaded axially extending bore 206 which is arranged to accommodate a bolt 207, the bolt being arranged to secure an end cap portion 208 to the end 205 of the centering shaft 184. The end cap 208 is of circular cross-section, having a diameter slightly less than the diameter of an axially extending throughway 209 provided within the end of the outer housing 183. An annular bearing cap 210 of diameter similar to the diameter of the end cap 208 is arranged to be coaxially mounted about the portion of reduced diameter 204 of the centering shaft 184. A sleeve bearing 211 is positioned between the centering shaft 184 and the bearing cap 210 to allow the shaft 184 to be axially displaceable relative to the bearing cap.

The end cap 208 and the bearing cap 210 are held in an axially spaced-apart relationship by means of three compression spring 225 which are arranged between guide rods 220, each guide rod being arranged to be located in one of three axially extending bores 240 provided in an equally spaced configuration around the end cap 208 on the one hand, and in one of three axially tapped throughways 241 positioned in a corresponding configuration in the bearing cap 210. The arrangement of the end cap 208 and bearing cap 210 is such that axial displacement of the end cap 208 towards the bearing cap 210 will compress the compression spring 225, and since the end cap 208 is bolted to the base of the centering shaft 184, vertical movement of the end cap 208 will vertically displace the centering shaft 184 relative to the chuck body 185.

The centering shaft 184 is firmly located within the spigot hole 13 of the wheel disc 14 by means of a cylindrical split spring steel collet 221 which is secured within the chuck body throughway 194 to engage the periphery of the frusto-conical locating portion 202 of the centering shaft 184. The collet 221 comprises an annular base plate 222 having eight axially extending arcuate fingers 221A formed integrally thereon. The annular base 222 is arranged to locate within the chuck body throughway 194 against a shoulder 223 defined by the chuck body 185, and is held within the throughway 194 by an axially extending cylindrical flange 224 forming an integral part of the disc supporting ring 192.

The axially extending fingers 221A extend to form a cylinder having a diameter less than the diameter of the spigot hole 13 of the wheel disc 14. When a wheel is fitted to the chuck 12 the fingers 221A extend through the spigot hole 13 and are a clearance fit within the hole 13. As shown in FIG. 6, the inner face 226 of each finger is inclined parallel to the inclined side of the locating portion 202 of centering shaft 184 so that as the shaft 184 is displaced by the springs axially towards the base of the machine (vertically downwards) the wedge profile of the shaft locating portion 202 forces the fingers 221A to splay out to firmly engage the spigot hole 13 of the wheel disc.

With the chuck in the position as shown in FIG. 6, the compression springs 225 are expanded and the end cap 208 is axially displaced away from the bearing cap 210. The wedge-shaped locating portion 202 of the centering shaft has forced the fingers 221A of the collet 221 into engagement with the spigot hole 13 of the wheel disc 14 thereby clamping the wheel about the centering shaft 184, further location being provided by the surface contact of the disc 14 and the outer surface of the disc supporting ring 192. To release the wheel from the chuck the centering shaft 184 must be axially displaced relative to the chuck body 185 by applying a force against the outer surface of the end cap 208 to compress the springs 225 and force the centering shaft 184 further through the spigot hole 13 of the wheel disc 14. As the centering shaft 184 is displaced through the spigot hole 13 the diameter of the frusto-conical location portion 202 reduces and the fingers 221A of the collet 221 return to their normal cylindrical unsprung state, and thereby cease to engage the spigot hole 13 of the wheel disc. Once the fingers 221A have been released the wheel may be lifted clear of the centring shaft 184.

At each of the loading and unloading stages 3 and 6 (FIG. 2) the force required to displace the centering shaft relative to the chuck body 185 is provided by a pneumatic piston and cylinder assembly 270 (shown in FIG. 1). At each loading and unloading stage the piston and cylinder assembly 270 is secured to the base structure 1 of the machine at a position vertically below the position of the chuck 12 when the frame 2 has been indexed. The piston rod 271 is arranged to extend vertically upwards towards the chuck 12, and is coupled to a circular pressure plate 272 which is arranged on actuation of the piston/cylinder assembly to engage the base of the end cap 208 of the chuck 12 and vertically displace the said cap 208 and centering shaft 184 against the compression springs 225 and thereby release the wheel as described above.

FIG. 6 also shows a method for ensuring that when the arm 7 has been indexed to its required position, the arm is clamped against further movement relative to its axis while the grinding operation is taking place.

A steel block 250 is rigidly secured vertically below the arm 7 and is provided with a cut-out 251. A pneumatic piston and cylinder assembly 260 is secured to the top flange 80 of the base structure 1 and the flange 80 is provided with a lug 253 on which a clamping block 254 is bolted. The clamping block 254 is provided with a laterally extending flange portion 255 which is arranged to extend in the same plane as the plane of the cut-out 251 in the block 250 positioned underneath the rotating arm 7. The piston and cylinder assembly and the clamping block 254 are positioned directly below the base of the block 250 on the rotating arm 7. The dimensions of the flange 255 are arranged so that when the arm 7 circles past the piston and cylinder assembly 260 the cut-out 251 passes over the stationary flange 255. When the arm 7 has been indexed to one of its grinding positions, the flange 255 is arranged to be directly within the cut-out 251 of the block 250. A load-distributing end cap 262 is screwed onto the piston rod 261 of the piston and cylinder assembly 260 and on actuation of the cylinder the load distributing end cap 262 is arranged to engage the base of the block 250. The thrust exerted by the piston rod 261 forces the block 250 and the chuck and tire and wheel assembly vertically upwards until the base 263 of the cut-out 251 engages the adjacent surface of the flange 255. This has the effect of very slightly lifting the whole arm and chuck assembly about the central shaft 34. (The bearings 183A are provided with a small amount of axial clearance). By clamping the arm 7 at a position much closer to the chuck 12 than the central axis 34 of the machine, any remaining moment produced by the grinding wheel and driving mechanism when they engage the tire and wheel assembly is reduced and therefore the tendency of the arm 7 to rotate about the central axis of the machine during the grinding operation is also reduced.

Clamping members of the above kind are provided for each arm of the frame 2.

Details of the pneumatic and electrical circuits will not be described, as these circuits may be of conventional type for use in controlling machinery of this kind. It is sufficient to state that a number of limit switches are provided in various locations within the apparatus to provide a cut-out mechanism which ensures that damage will not be done to the apparatus if one of the components fails to operate. The electrical circuitry is connected to a manually operated control panel which is located at the side of the machine.

Because the apparatus comprises four separate stages there are a number of methods of operation which can be carried out to grind a tire and wheel assembly. On the one hand it is possible to grind one tire twice, i.e. once at the first grinding station and secondly at the second grinding station, or on the other hand two tyres may be ground once, the two tires being ground simultaneously one at each of the two stages. In the case where one grinding station is inoperative, a single tire may be ground at the one station that remains in operation. Furthermore a tire can be ground to a certain diameter at one station and then ground to a smaller diameter at the second station, or alternatively a coarse grinding wheel may be used at the first station with a fine finishing grinding wheel used at the second grinding station.

One mode of operation of the machine will now be described where one tire is subjected to two separate grinding operations, the depth of tread removed at the two respective stages being different.

A pneumatic tire and wheel assembly inflated to the normal running pressure is loosely positioned on the chuck 12 of the arm of the four stage frame 2 which is at the loading stage 3. The chuck releasing cylinder 270 at the unloading stage is actuated and the centering shaft 184 of the chuck 12 is displaced vertically upwards relative to the chuck body 185 thereby allowing the centering shaft to locate within the spigot hole 13 of the wheel disc.

The piston and cylinder assembly 270 is then exhausted and the tire and wheel assembly is firmly located on the chuck 12 by the mechanism previously described. The indexing mechanism is then actuated and rotates the frame member 2 through 90° so that the tire and wheel assembly is rotated to the first grinding stage 4. As described earlier in the specification the frame 2 is located and locked after travelling through 90°. With the frame 2 locked in the required position, the driving mechanism 20 and grinding apparatus 21 are displaced by their respective piston and cylinder assemblies and are pivoted about their support shafts until the drum of the driving mechanism contacts the tread of the tire on one side of the tire and wheel assembly and the face of the grinding wheel engages the tread of the tire on the diametrically opposite side of the tire and wheel assembly. It is important in the above operation that the driving drum engages the tire before the grinding wheel and disengages after the grinding wheel, otherwise the grinding wheel would be liable to drive the tire and wheel assembly. Before the grinding operation of the machine is commenced the adjustable stop on the head of the grinding apparatus is adjusted so that the grinding wheel will grind to a required diameter, say, for instance, to remove 0.012 of an inch off the nominal radius of the tire. The stop on the second grinding stage 5 may be adjusted so that the grinding wheel will remove a further 0.008 of an inch off the nominal radius. The choice of the depth of tread that is to be removed is determined by: (a) the degree of non-uniformity of the tire and the variation in the high and low spots of the tread, and (b) depending on the degree of uniformity required, the amount of tread that should be removed to ensure uniformity of the tire and wheel assembly while not substantially reducing the road life of the tire.

When the grinding apparatus and driving mechanism are in engagement with the tread of the tire at the first grinding stage, the electric motor in the driving mechanism rotates the steel driving drum through the reduction gearbox to rotate the tire and wheel assembly in a clockwise direction as viewed in FIG. 2 at a speed of approximately 4.5 revolutions per minute. The grinding wheel electric motor is actuated and the grinding wheel is arranged to engage the tread of the tire while the tire rotates through approximately 4 revolutions. (The grinding wheel is arranged to rotate clockwise as viewed in FIG. 2). When the first grinding operation is completed the driving mechanism and grinding apparatus are pivoted away from the tire and wheel assembly by their respective actuating piston and cylinder assemblies, and when this motion is completed the frame 2 is indexed through a further 90°. The second indexing motion transports the tire and wheel assembly from the first grinding stage to the second grinding stage; meanwhile a second tire and wheel assembly has been loaded onto the adjacent arm of the frame 2 and has been transported to the first grinding stage. A third and fourth tire and wheel assembly will be subsequently positioned on the other two arms when they reach the loading stage. In this manner four tire and wheel assemblies can be mounted on the frame member 2 at one time and a continuous process may be carried out where for each indexing operation, one tire and wheel assembly is loaded onto the apparatus and another tire and wheel assembly which has been ground is removed from the unloading stage. The loading and unloading of the tire and wheel assemblies may be carried out manually, although an automatic system could be installed which would automatically place a tire and wheel assembly over the chuck at the loading stage and remove the finished assembly at the unloading stage.

Reverting to the sequence of the operation; when the first tire and wheel assembly reaches the second grinding stage 5 and is locked in this position, the driving mechanism and grinding apparatus are pivoted into engagement with the tread of the tire as previously described and a further grinding operation carried out. At the second grinding stage the driving mechanism is arranged to rotate the tire and wheel assembly anti-clockwise as viewed in FIG. 2 and the grinding wheel is arranged to rotate in an anti-clockwise direction i.e. both the driving wheel and grinding wheel rotate in a direction opposite to the directions through which they rotated at the first stage. This reversal of direction means that the tire is ground at the second stage in the reverse direction to that of the first stage, thereby ensuring that the tire receives a far more uniform grind than would be received if the tire was only ground in one direction. Because of the elastic properties of the tyre rubber, a grinding operation carried out in only one direction would produce a distorted tread pattern and would cause feathering of the tread blocks in the direction of the grind, while reversed grinding will balance this feathering of the tread pattern, and the tread of the ground tire will not be unduly disfigured. As an alternative, the direction of rotation of only either of the grinding wheel or driving wheel may be reversed. Since the grinding wheel at the second grinding stage is arranged to remove less tread than the grinding wheel of the first stage, a grinding wheel of finer texture may be used to give a smoother finish.

At the completion of the second grinding operation at the second grinding stage, the driving mechanism and grinding apparatus are displaced away from the tire and wheel assembly and the frame member 2 is indexed through a further 90° to bring the tire and wheel assembly to the unloading station. At the unloading station the chuck releasing piston and cylinder assembly 270 is actuated to vertically displace the centering shaft of the chuck and thereby release the tire and wheel assembly. The tire and wheel assembly in its finished state should have had the high spots of the tire ground off and should be substantially uniform, the degree of uniformity depending on the amount of tread which has been ground off.

A machine of the above construction, that is a four stage grinding machine having reversible grinding, has the advantage over the more conventional single stage grinding machine, that the machine is much faster in operation. In single stage grinding machines time is wasted in loading and unloading the tire and wheel assemblies and in reversing the rotation of the wheel to carry out a reverse grind. Because the driving and grinding mechanisms are operated by electric motors time is wasted in conventional machines in firstly stopping the motors and then reversing the motors, and allowing the motors to speed up to their normal working speeds. With the machine disclosed above, machine time is not wasted in the loading and unloading operations because these can be carried out while two other tire and wheel assemblies are being subjected to the first and second grind respectively. Furthermore because the reversed grinding is carried out at a separate stage there is no need to stop and reverse the driving and grinding motors to reverse the rotation of the tire and wheel assembly. If the loading and unloading procedure is automated, only one operator is required to ensure that there is an adequate supply of tire and wheel assemblies requiring grinding, and that the ground tire and wheel assemblies are transported away from the machine.

A further advantage is that if the machine is in great demand, and time cannot be afforded to service the grinding stages, one grinding stage can be taken out of operation and a single stage grinding can be carried out on the tire and wheel assemblies. Although this above procedure does not enable a reversed grinding operation to be carried out on the tire and wheel assembly, the machine is still partially operational.

In a further mode of operation, if only a single grinding operation is required a tire and wheel assembly can be mounted at the loading and unloading stage and the frame member 2 may be subsequently indexed through 180° so that the tire and wheel assembly at the loading stage is rotated to the second grinding stage and the tire and wheel assembly at the unloading stage is rotated to the first grinding stage. The two grinding stages are adjusted to remove the same quantity of tread from the tire, so that on completion of the grinding operation two tire and wheel assemblies are subjected to a single grinding operation, and on indexing the frame through a further 180° the tire and wheel assemblies return to the unloading and loading stations where they can both be unloaded. This procedure provides a very swift grinding operation but of course the tire and wheel assemblies are only ground in one direction.

We claim:

1. A method for improving the uniformity of a pneumatic tire or tire and rim assembly comprising locating the tire or tire and rim assembly on rotatable mounting means, rotating the tire with the tread of the tire in engagement with a first rotating grinding wheel and grinding the tire to a first predetermined diameter, moving the rotatable mounting means to bring the tread of said tire into engagement with a second rotating grinding wheel, rotating the tire with the tread in engagement with the second grinding wheel and grinding the tire tread to a second predetermined diameter with the second grinding wheel, and reversing the direction that the second grinding wheel engages the tire relative to the direction that the first grinding wheel engages the tire.

2. A method according to claim 1 comprising rotating the tire in a direction opposite to the direction of rotation of the first grinding wheel, reversing the direction of rotation of the tire when in contact with the second grinding wheel, and reversing the direction of rotation or the second grinding wheel relative to the first grinding wheel.

3. Apparatus for improving the uniformity of a pneumatic tire or tire and rim assembly comprising means for mounting a tire or tire and rim assembly for free rotation about the axis of the tire, each mounting means being locatable in a plurality of positions, means to rotate the tire in one of said positions about its axis against a first grinding wheel engageable with the tread of the tire, and means to rotate the tire in another of said positions about its axis against a second grinding wheel engageable with the tread of the tire, the direction that the second grinding wheel engages the tire being reversed relative to the direction that the first grinding wheel engages the tire, and wherein when one tire is in engagement with the second grinding wheel another tire is engaged with the first grinding wheel.

4. Apparatus for improving the uniformity of a pneumatic tire or tire and rim assembly comprising at least two supporting arms, each arm arranged to carry means for mounting a tire or tire and rim assembly for free rotation about the axis of the tire, each supporting arm being displaceably locatable in a plurality of positions, means at two separate positions to engage a tire in order to rotate the tire, a grinding wheel carried on a support member in each of said two separate positions, the grinding wheel support member being displaceable, and an adjustable gauge means to control the degree of engagement between the tread surface of the tire and the surface of the grinding wheel, the direction that the grinding wheel of one position engages the tire being reversed relative to the direction that the grinding wheel of the other of the two positions engages the tire, and wherein when one tire is in engagement with the grinding wheel of the one position another tire is in engagement with the grinding wheel of the other of the two positions.

5. Apparatus according to claim 4 wherein each supporting arm comprises one of four arms of a frame, each arm extending perpendicularly to the adjacent arm to form a cross rotatable in a horizontal plane about the mid-point of the cross.

6. Apparatus according to claim 5 wherein the means for mounting the tire comprises means to support the tire to enable rotation of the tire, and a chuck positioned at the outer end of each arm to enable the tire to be located on the arm and allow rotation thereon about the axis of the tire.

7. Apparatus according to claim 5 wherein the means for mounting a tire and rim assembly comprises a chuck positioned at the outer end of each arm and arranged to engage the rim of the assembly to locate the assembly on the arm and allow rotation thereon about the axis of the tire.

8. Apparatus according to claim 7 wherein the chuck comprises a centering shaft having tapered sides and which is enclosed within a housing secured to the supporting arm, an annular collet associated with the shaft and secured to the housing, the centering shaft being axially displaceable relative to the housing from a first position wherein the centering shaft and associated annular collet are a loose fit within an associated rim having a central spigot hole to a second position wherein the tapered sides of the centering shaft wedge the collet against the wall of the spigot hole thereby firmly locating the rim on the centering shaft, the centering shaft and collet being rotatable relative to the housing and supporting arm.

9. Apparatus according to claim 8, further comprising biasing means to urge the shaft to the first position, and means to displace the centering shaft to the second position where the rim is firmly engaged.

10. Apparatus according to claim 5 wherein an indexing mechanism is arranged to displace the frame and locate it selectively in one of four positions which constitute four stations of the apparatus.

11. Apparatus according to claim 5 wherein the means to rotate the tire, comprises an electrically driven drum, the periphery of which is arranged to engage the tire, the drum being mounted on a drum support member, the drum support member being displaceable from a first position where the drum engages the tire to a second position where the drum and drum support member are out of the path of the tire when located on the frame, so as to permit rotation of the frame.

12. Apparatus according to claim 5 wherein each grinding wheel is electrically driven and is mounted on a grinding wheel support member displaceable from a first position where the grinding wheel engages the tread portion of the tire to a second position where the grinding wheel and grinding wheel support member are out of the path of the tire when located on the frame, so as to permit rotation of the frame.

13. Apparatus according to claim 11 wherein each support member is pivoted about a pivot point provided on a fixed support, and further comprising fluid pressure operating means to displace the support member being displaceable to and from the first and second positions.

14. Apparatus according to claim 12 wherein each support member is pivoted about a pivot point provided on a fixed support, and further comprising fluid pressure operating means to displace the support member being displaceable to and from the first and second positions.

15. Apparatus according to claim 10 wherein the indexing mechanism comprises a shaft coupled to and coaxial with the frame, means to effect initial rotation of the shaft, and cam means associated with the shaft engageable by a follower to urge the shaft and associated frame through four stations.

16. Apparatus according to claim 15 wherein the means to effect initial rotation of the shaft comprises a chain, a chainwheel coaxially mounted on the shaft, a sprocket connected by the chain to the chainwheel, and a first piston and cylinder assembly arranged to displace the sprocket, the sprocket having ratchet means to allow the sprocket to free-wheel in one direction.

17. Apparatus according to claim 16 further comprising a second piston and cylinder assembly, and wherein the cam means comprises a four-lobed cam coaxially secured to the shaft, and the follower comprises a first pivoted roller which is urged against the periphery of the cam by the piston of the second piston and cylinder assembly.

18. Apparatus according to claim 17 wherein each station is arranged at an angular spacing of 90° about the axis of the frame relative to the adjacent station, and for each indexing operation the sprocket and chain, cam and follower are arranged such that the first piston and cylinder assembly which displaces the sprocket and chain initially rotates the shaft through a small angle and the second piston and cylinder which urges the roller is arranged such that the follower forces the cam to rotate through an angle of substantially 90°, the stroke of the pistons selected to ensure that the shaft is not rotated through more than 90° for each operation.

19. Apparatus according to claim 18 further comprising means to ensure that the frame is indexed through exactly 90° at each indexing operation, said ensuring means comprising a third piston and cylinder assembly, the cylinder of this third assembly being secured to the frame, the outward end of the piston of the third assembly being provided with a second roller which is arranged to locate within a V-shaped block associated with the frame such that displacement of the piston of the third assembly forces the second roller into the apex of the V of the block.

20. Apparatus according to claim 5 further comprising means to ensure that the frame is rigidly clamped in a stationary position when the grinding of the tire is taking place.

21. Apparatus according to claim 20 wherein the means to clamp the frame comprises at least one set of two interengaging members, one member being secured to the frame and the other member being secured to the supporting arm of the frame, the members being slidable relative to one another on rotation of the frame, and means to bring the members into firm engagement with one another to clamp the frame when the respective arm is indexed to one of the grinding positions.

22. Apparatus according to claim 5 wherein the adjustable gauge means to control the degree of engagement between the tread surface of the tire and the grinding wheel comprises a protruding adjustable member secured to the grinding wheel support member, the protruding member being arranged to engage the supporting arm of the frame on which the tire to be ground is mounted to define the degree of contact between the outer surface of the grinding wheel and the tread surface of the tire.

23. Apparatus according to claim 22 further comprising a small damper at the extremity of the protruding member to absorb backlash caused by the impact of the protruding member against the associated supporting arm of the frame.

24. A method of improving the uniformity of a pneumatic tire comprising locating a tire on a chuck assembly, clamping said tire on the chuck assembly, indexing a frame having four mutually perpendicular extending arms through 90°, clamping the frame in an indexed position, displacing a first driving means support member to bring a drum of a first driving means into engagement with the tread of the tire, displacing a first grinding wheel support member to bring an associated first grinding wheel into engagement with the tread surface of the tire, grinding said tire to a first diameter, displacing the first driving support member and first grinding support member out of the path of the frame, unclamping the frame, indexing the frame through a further 90° to a second grinding position, and clamping the frame in said second position, displacing a second driving means support member and second grinding wheel support member to bring a drum of a second driving means and an associated second grinding wheel into engagement with the tread of the tire and grinding said tire to a second diameter, displacing the second driving means and second grinding wheel support member out of the path of the frame, unclamping the frame, indexing the frame through a further 90° and releasing the chuck assembly to allow removal of the tire.

* * * * *